US007666535B2

United States Patent
Ueda et al.

(10) Patent No.: US 7,666,535 B2
(45) Date of Patent: Feb. 23, 2010

(54) FUEL CELL SYSTEM AND METHOD OF OPERATING A FUEL CELL SYSTEM

(75) Inventors: Kenichiro Ueda, Utsunomiya (JP); Junji Uehara, Utsunomiya (JP); Yuji Matsumoto, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 124 days.

(21) Appl. No.: 11/517,039

(22) Filed: Sep. 7, 2006

(65) Prior Publication Data

US 2007/0054167 A1    Mar. 8, 2007

(30) Foreign Application Priority Data

Sep. 7, 2005    (JP) .............................. 2005-259134

(51) Int. Cl.
*H01M 8/04*    (2006.01)
(52) U.S. Cl. .......................................... 429/25; 429/13
(58) Field of Classification Search ................. 429/13, 429/25
See application file for complete search history.

(56) References Cited

U.S. PATENT DOCUMENTS 6,815,106 B1    11/2004    Salvador et al.

2002/0175010 A1 *  11/2002   Kobayashi et al. .......... 180/65.3
2005/0118467 A1     6/2005   Ojima et al.

FOREIGN PATENT DOCUMENTS

| JP | 2001-345112 | 12/2001 |
|----|-------------|---------|
| JP | 2004-165087 | 6/2004  |
| JP | 2005-158647 | 6/2005  |

OTHER PUBLICATIONS

Japanese Office Action for Application No. 2005-259134, dated Mar. 31, 2009.

\* cited by examiner

*Primary Examiner*—Patrick Ryan
*Assistant Examiner*—Ben Lewis
(74) *Attorney, Agent, or Firm*—Lahive & Cockfield, LLP; Anthony A. Laurentano

(57) ABSTRACT

A fuel cell system includes a control device for setting an oxygen-containing gas operating pressure target value on the cathode side using a relative pressure relative to atmospheric pressure, setting a fuel gas operating pressure target value on the anode side using an absolute pressure, and controlling a power generation current of the fuel cell using as command values the relative pressure and the absolute pressure. The control device controls operation of the entire fuel cell system.

3 Claims, 6 Drawing Sheets

FUEL CELL SYSTEM AND METHOD OF OPERATING A FUEL CELL SYSTEM

BACKGROUND OF THE INVENTION

1. Field of the Invention

The present invention relates to a fuel cell system, including a fuel cell, which is operated to provide power generation by consuming a fuel gas supplied to an anode and an oxygen-containing gas supplied to a cathode. Further, the present invention relates to a method of operating such a fuel cell system.

2. Description of the Related Art

A polymer electrolyte fuel cell employs a membrane electrode assembly (electrolyte electrode assembly), which includes an anode (fuel electrode), a cathode (air electrode), and an electrolyte membrane interposed between the anode and the cathode. The electrolyte membrane is made up of a polymer ion exchange membrane. The membrane electrode assembly, along with separators sandwiching the membrane electrode assembly therebetween, collectively make up a unit of a power generation cell (unit cell) that generates electricity. Generally, when placed in use, a predetermined number of unit cells are stacked together to form a fuel cell stack.

In the fuel cell, a fuel gas such as a hydrogen-containing gas is supplied to a fuel gas flow field. The fuel gas flows through the fuel gas flow field and along the anode. A catalyst included in the anode induces a chemical reaction in the fuel gas, in order to split hydrogen molecules into hydrogen ions and electrons. The hydrogen ions move toward the cathode through a suitably humidified electrolyte membrane, whereby the electrons flow through an external circuit to the cathode, thus generating DC electrical energy. Further, in the fuel cell, an oxygen-containing gas, such as air, is supplied to the oxygen-containing gas flow field, wherein the oxygen-containing gas flows along the cathode to induce a reaction. In the cathode, hydrogen ions from the anode combine with the electrons and oxygen to produce water.

The efficiency of this type of the fuel cell tends to change easily depending on ambient pressure. For example, if the fuel cell is operated in a high pressure environment, power generation by the fuel cell is carried out efficiently. A compressor for supplying air to the cathode operates highly efficiently when the fuel cell is operated within a predetermined compression ratio range. However, at high altitudes, where atmospheric pressure is low, since the atmospheric air density is low, the compression ratio must be increased, thus lowering the efficiency of the compressor.

In this regard, Japanese Laid-Open Patent Publication No. 2001-345112 discloses a fuel cell system, as shown in FIG. 6. The fuel cell system includes a fuel cell 1, a fuel processor 2 for supplying hydrogen to an anode (not shown) of the fuel cell 1, a compressor 3 for supplying oxygen to a cathode (not shown) of the fuel cell 1, a pressure regulator 4 for changing the back pressure of a cathode tail gas, pressure detecting sensors 5a to 5d, and a controller 6.

The pressure sensor 5a detects an inlet pressure of the compressor 3, whereas the pressure sensor 5b detects an outlet pressure of the compressor 3, i.e., the pressure occurring along a line 7. The pressure sensor 5c detects a pressure along another line 8, which is the back pressure applied to the system by the pressure regulator 4. The pressure sensor 5d detects an ambient pressure (atmospheric pressure) in the vicinity of the fuel cell system.

In the above configuration, it is desirable to maintain the outlet pressure of the compressor 3 at a substantially constant level, irrespective of the ambient pressure. Therefore, when the fuel cell system is operated at a high altitude, such as at the peak of a mountain, the pressure sensor 5b monitors the pressure along the line 7. As the pressure along the line 7 begins to decrease commensurate with the increase in altitude, the pressure sensor 5b outputs a signal to the controller 6, whereby the controller 6 outputs a signal to the pressure regulator 4 for increasing the system back pressure up to a desired pressure value.

However, in the aforementioned conventional technique, a pressure regulator 4 must be provided, and further, the valve position of the pressure regulator 4 must be adjusted in correspondence with fluctuations in atmospheric pressure. Thus, controlling the pressure regulator 4 through the controller 6 is quite complicated.

SUMMARY OF THE INVENTION

A main object of the present invention is to provide a fuel cell system and a method of operating the fuel cell system, which has a simple structure and is operated through simple steps, wherein the power generation efficiency of the fuel cell can be measurably improved, irrespective of the influence of fluctuations in ambient pressure.

The present invention relates to a fuel cell system, including a fuel cell, which is operated to provide power generation by consuming a fuel gas supplied to an anode and an oxygen-containing gas supplied to a cathode.

Further, the fuel cell system includes a control device for setting an oxygen-containing gas operating pressure target value on the cathode side using a relative pressure relative to atmospheric pressure, setting a fuel gas operating pressure target value on the anode side using an absolute pressure, and controlling a power generation current of the fuel cell using as command values the relative pressure and the absolute pressure.

Preferably, the fuel cell system further comprises a relative pressure detection unit for detecting an operating pressure of the oxygen-containing gas that is supplied to the cathode as the relative pressure, and an absolute pressure detection unit for detecting an operating pressure of the fuel gas that is supplied to the anode as the absolute pressure.

Preferably, the fuel cell system further comprises an atmospheric pressure detection unit for detecting the atmospheric pressure, a differential pressure detection unit for detecting a differential pressure between the fuel gas operating pressure target value on the anode side and the oxygen-containing gas operating pressure target value on the cathode side, and an upper limit value setting unit for setting a fuel gas operating pressure upper limit value on the anode side based on the oxygen-containing gas operating pressure target value on the cathode side, the atmospheric pressure, and the differential pressure.

In addition, the present invention concerns a method of operating a fuel cell system, comprising a fuel cell, which is operated to provide power generation by consuming a fuel gas supplied to an anode and an oxygen-containing gas supplied to a cathode.

The method comprises the steps of setting an oxygen-containing gas operating pressure target value on the cathode side using a relative pressure relative to atmospheric pressure, setting a fuel gas operating pressure target value on the anode side using an absolute pressure, and controlling a power generation current of the fuel cell using as command values the relative pressure and the absolute pressure.

Further, preferably, a differential pressure between a fuel gas operating pressure target value on the anode side and an oxygen-containing gas operating pressure target value on the cathode side is detected, and a fuel gas operating pressure upper limit value on the anode side is set based on the oxygen-containing gas operating pressure target value on the cathode side, the atmospheric pressure, and the differential pressure.

According to the present invention, the oxygen-containing gas operating pressure target value on the cathode side is set using a relative pressure relative to atmospheric pressure. Therefore, for example when the atmospheric pressure decreases, it is not necessary to increase the compression ratio of the compressor that supplies the oxygen-containing gas in order to maintain the operating pressure on the cathode side. Therefore, the compressor can be used within an operating range at high efficiency.

Thus, power consumption of the compressor can be suitably controlled, and overall output efficiency (NET output) of the fuel cell system can be effectively improved. Accordingly, by means of a simple process and structure, power generation efficiency of the fuel cell can be suitably improved, without being influenced by fluctuations in ambient pressure (atmospheric pressure).

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
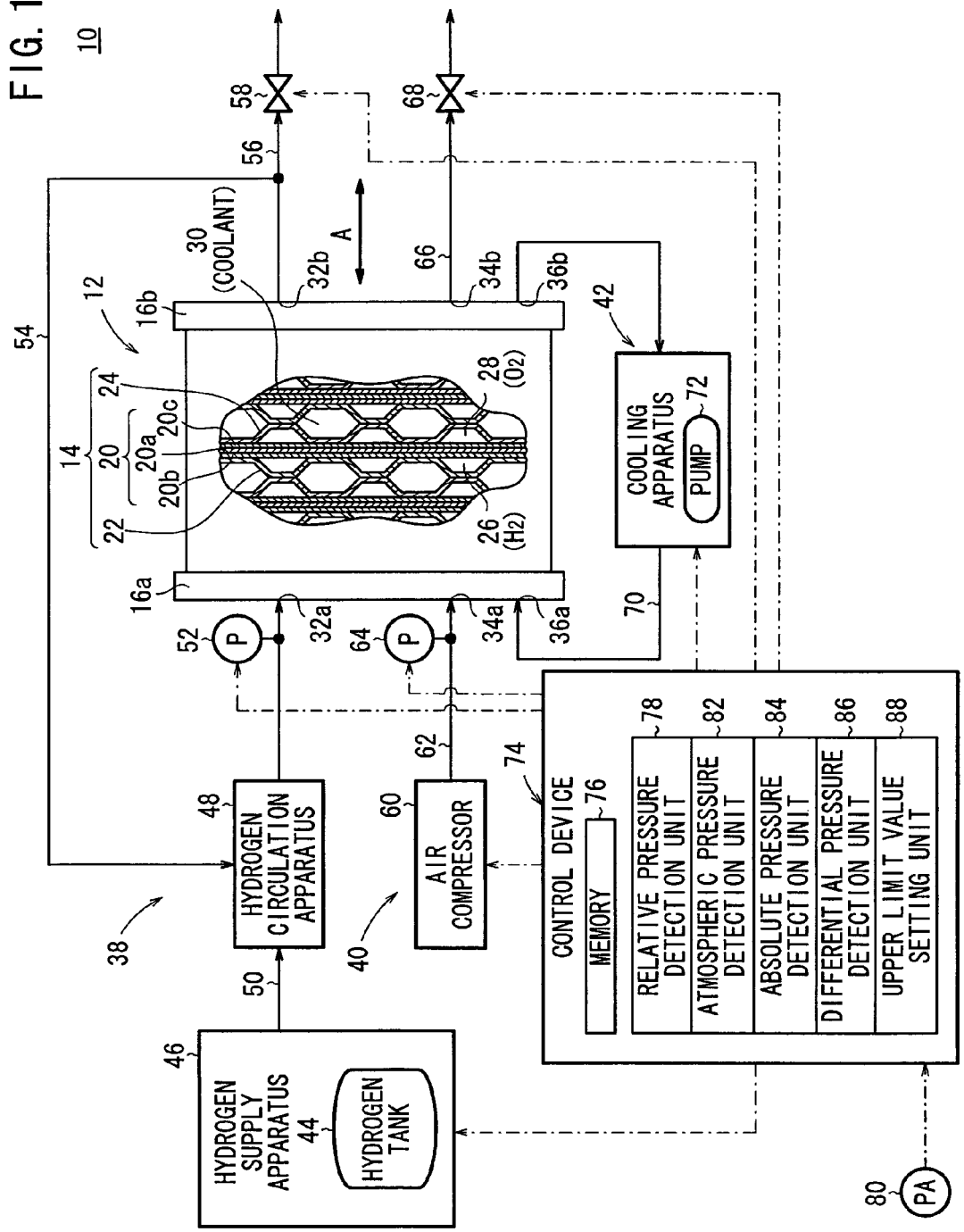
FIG. 1 is a diagram showing schematically a fuel cell system according to an embodiment of the present invention.

FIG. 1 is a diagram that illustrates schematically the structure of a fuel cell system 10 according to an embodiment of the present invention. The fuel cell system 10 includes a fuel cell 12, having a stack structure formed by stacking a plurality of power generation cells 14 in a direction indicated by the arrow A. End plates 16a, 16b are provided at opposite ends of the fuel cell 12. The components between the end plates 16a, 16b are tightened together to assemble the fuel cell 12.

Each of the power generation cells 14 includes a membrane electrode assembly 20, and metal or carbon separators 22, 24 sandwiching the membrane electrode assembly 20 therebetween. The membrane electrode assembly 20 includes an anode 20b, a cathode 20c, and a solid polymer electrolyte membrane 20a interposed between the anode 20b and the cathode 20c. The solid polymer electrolyte membrane 20a may be formed by impregnating a thin perfluorosulfonic acid membrane with water, for example.

A fuel gas flow field 26 is formed between the separator 22 and the membrane electrode assembly 20, and an oxygen-containing gas flow field 28 is formed between the separator 24 and the membrane electrode assembly 20. A coolant flow field 30 is formed between adjacent separators 22 and 24.

The end plate 16a contains a fuel gas inlet port 32a, for supplying a fuel gas such as hydrogen gas to each of the fuel gas flow fields 26. The end plate 16a also contains an oxygen-containing gas inlet port 34a for supplying an oxygen-containing gas such as air to each of the oxygen-containing gas flow fields 28, and a coolant inlet port 36a for supplying a coolant to each of the coolant flow fields 30.

The end plate 16b includes a fuel gas outlet port 32b for discharging exhaust gas containing unconsumed hydrogen gas discharged from each of the fuel gas flow fields 26, an oxygen-containing gas outlet port 34b for discharging air discharged from each of the oxygen-containing gas flow fields 28, and a coolant outlet port 36b for discharging coolant discharged from each of the coolant flow fields 30.

A fuel gas supply system 38, an oxygen-containing gas supply system 40, and a coolant supply system 42 are connected to the fuel cell 12. The fuel gas supply system 38 includes a hydrogen supply apparatus 46 equipped with a hydrogen tank 44. The hydrogen supply apparatus 46 is connected by a hydrogen supply channel 50 to a hydrogen circulation apparatus 48 and, in turn, to the fuel gas inlet port 32a of the fuel cell 12. The hydrogen circulation apparatus 48 includes an ejector (not shown), for example.

A first pressure sensor 52 is disposed between the hydrogen circulation apparatus 48 and the fuel gas inlet port 32a. The first pressure sensor 52 detects an operating pressure of the fuel gas supplied to the anode 20b as an absolute pressure.

The first pressure sensor 52 detects the operating pressure of the fuel gas as a gauge pressure, and further determines the absolute pressure based on atmospheric pressure, which is detected by an atmospheric pressure sensor 80 (described later) and the gauge pressure. Specifically, the absolute pressure is equal to the sum of the gauge pressure and the atmospheric pressure. For example, if the gauge pressure is zero, the absolute pressure is simply the same as the atmospheric pressure.

The hydrogen circulation channel 54 is connected to the fuel gas outlet port 32b of the fuel cell 12. The hydrogen circulation channel 54 merges with the hydrogen supply channel 50 via the hydrogen circulation apparatus 48. A purge valve 58 is connected to a hydrogen discharge channel 56 that branches from the hydrogen circulation channel 54.

The oxygen-containing gas supply system 40 includes an air compressor (or supercharger) 60 and an air supply channel 62 connected to the oxygen-containing gas inlet port 34a of the fuel cell 12. A second pressure sensor 64 is provided in the air supply channel 62. The second pressure sensor 64 detects an operating pressure of the air supplied to the cathode 20c, as a relative pressure relative to atmospheric pressure, i.e., as a gauge pressure. The gauge pressure is a differential pressure derived from atmospheric pressure. When the gauge pressure is zero, it represents the atmospheric pressure.

An air discharge channel 66 is connected to the oxygen-containing gas outlet port 34b of the fuel cell 12. A pressure regulator valve 68, for regulating the back pressure, is provided in the air discharge channel 66 as necessary.

The coolant supply system 42 includes a coolant circulation channel 70, which is connected to the coolant inlet port 36a and the coolant outlet port 36b of the fuel cell 12. A circulation pump 72 is provided within the coolant circulation channel 70, wherein the circulation pump 72 supplies coolant to the coolant flow field 30 in a circulating manner.

The fuel cell system 10 also includes a control device 74 for setting an oxygen-containing gas operating pressure target value (hereinafter referred to as a "cathode target pressure") using the relative pressure relative to atmospheric pressure, setting a fuel gas operating pressure target value (hereinafter referred to as an "anode target pressure") using the absolute pressure, and controlling a power generation current of the fuel cell 12 using as command values the relative pressure and the absolute pressure.

The control device 74 controls operation of the overall fuel cell system 10, and has a memory 76 for storing data therein, such as a first operating pressure calculation table 90 for the cathode 20*c* side, and a second operating pressure calculation table 92 for the anode 20*b* side.

Further, the control device 74 includes a relative pressure detection unit 78, an atmospheric pressure detection unit 82, and an absolute pressure detection unit 84. The relative pressure detection unit 78 detects an operating pressure of the air supplied to the cathode 20*c*, as a gauge pressure, in response to a detection signal from the second pressure sensor 64. The atmospheric pressure detection unit 82 detects the atmospheric pressure PA in response to a detection signal from the atmospheric pressure sensor 80. The absolute pressure detection unit 84 detects an operating pressure of the fuel gas supplied to the anode 20*b* based on a detection signal from the first pressure sensor 52 and the atmospheric pressure.

Further, the control device 74 includes a differential pressure detection unit 86 and an upper limit value setting unit 88. The differential pressure detection unit 86 detects a differential pressure between the anode target pressure on the anode 20*b* side and the cathode target pressure on the cathode 20*c* side. The upper limit value setting unit 88 sets an anode target pressure upper limit value (i.e., a fuel gas operating pressure upper limit value) as an absolute pressure.

Figure 2:
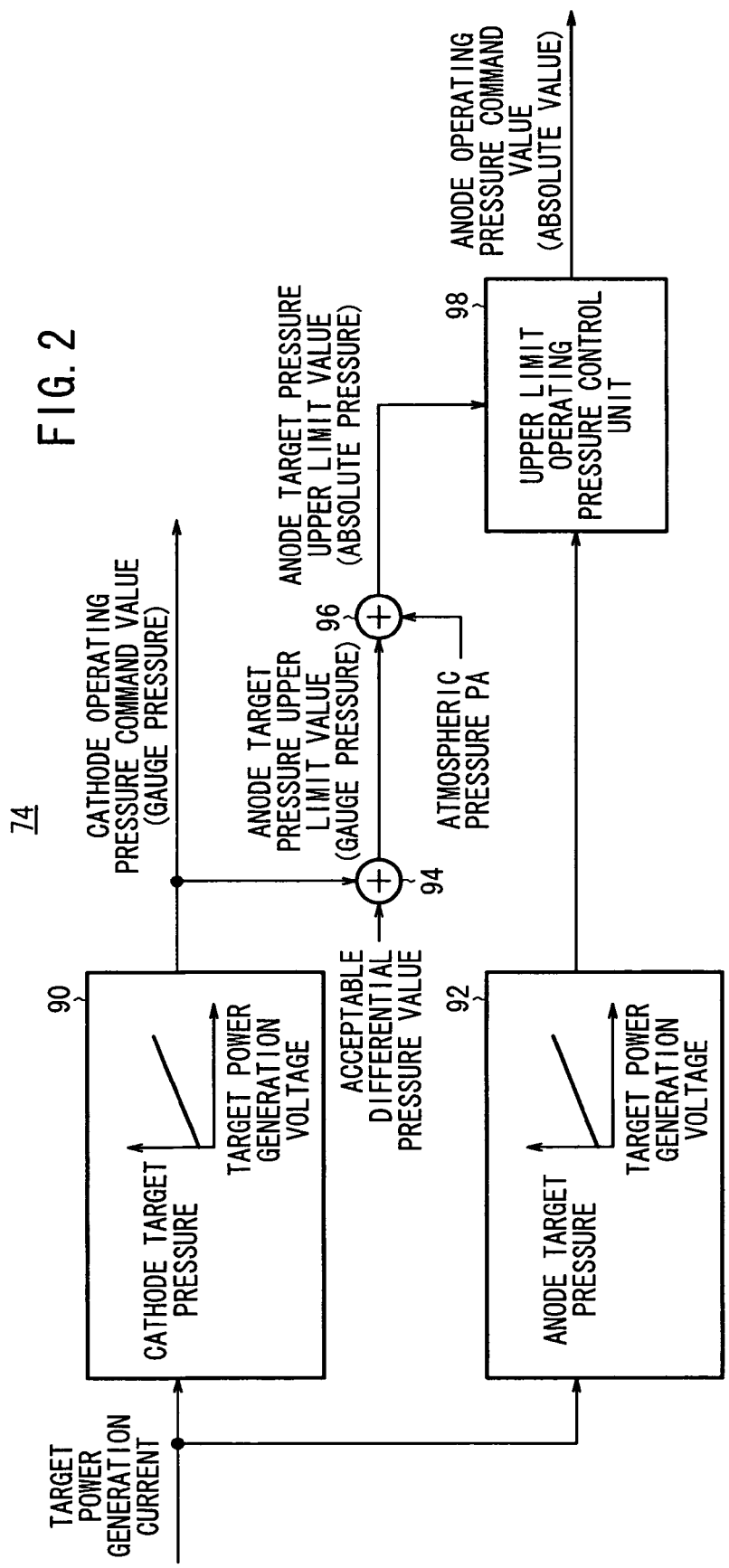
FIG. 2 is a block diagram showing a control device of the fuel cell system.

As shown in FIG. 2, the control device 74 includes, within the memory 76, the first operating pressure calculation table 90 on the cathode 20*c* side, and the second operating pressure calculation table 92 on the anode 20*b* side. The cathode target pressure, which is calculated from the first operating pressure calculation table 90, is output as a cathode operating pressure command value (gauge pressure) and is transmitted to a first adder 94.

Figure 3:
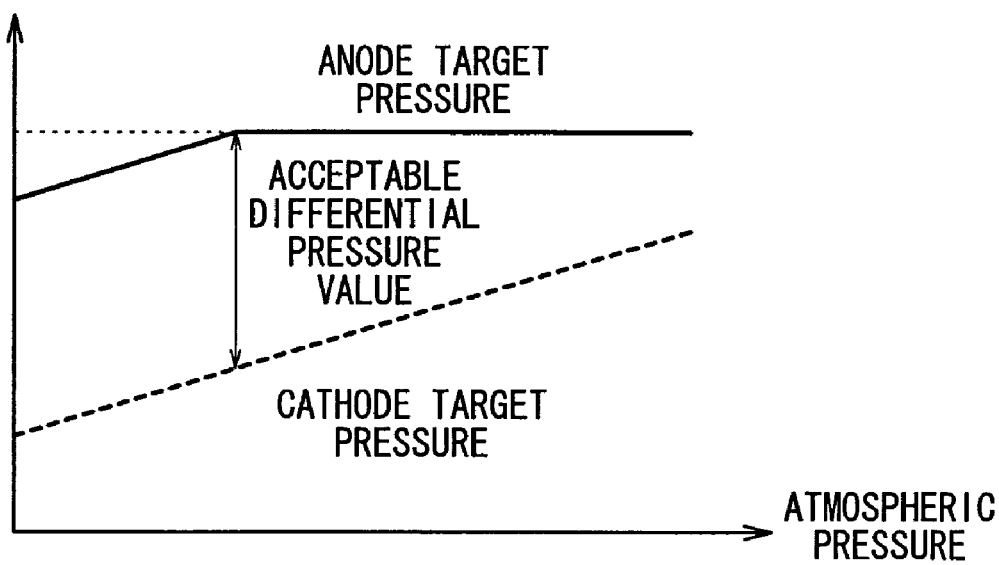
FIG. 3 is a graph showing an acceptable differential pressure value between the anode target pressure and the cathode target pressure.

An acceptable differential pressure value between the cathode target pressure and the anode target pressure is input to the first adder 94, whereby the anode target pressure upper limit value (gauge pressure) of the anode 20*b* is obtained by the first adder 94. The acceptable differential pressure value is set as shown in FIG. 3. The anode target pressure is set using the absolute pressure, whereas the cathode target pressure is set using the relative pressure relative to atmospheric pressure. Thus, when atmospheric pressure is low, since the cathode target pressure is low, the differential pressure between the anode target pressure and the cathode target pressure becomes large. The acceptable differential pressure value is set so as to prevent damage to the solid polymer electrolyte membrane 20*a* due to overly large differential pressures.

As shown in FIG. 2, the anode target pressure upper limit value (gauge pressure) is transmitted to the second adder 96. The anode target pressure upper limit value (gauge pressure) and the atmospheric pressure PA are input to the second adder 96, whereby the anode target pressure upper limit value (absolute pressure) of the anode 20*b* is obtained. The anode target pressure upper limit value (absolute value) is transmitted to an upper limit operating pressure restriction unit 98. Further, the anode target pressure of the anode 20*b* is input to the upper limit operating pressure restriction unit 98 from the second operating pressure calculation table 92. From the upper limit operating pressure restriction unit 98, an anode operating pressure command value (absolute pressure) of the anode 20*b* is obtained.

Figure 4:
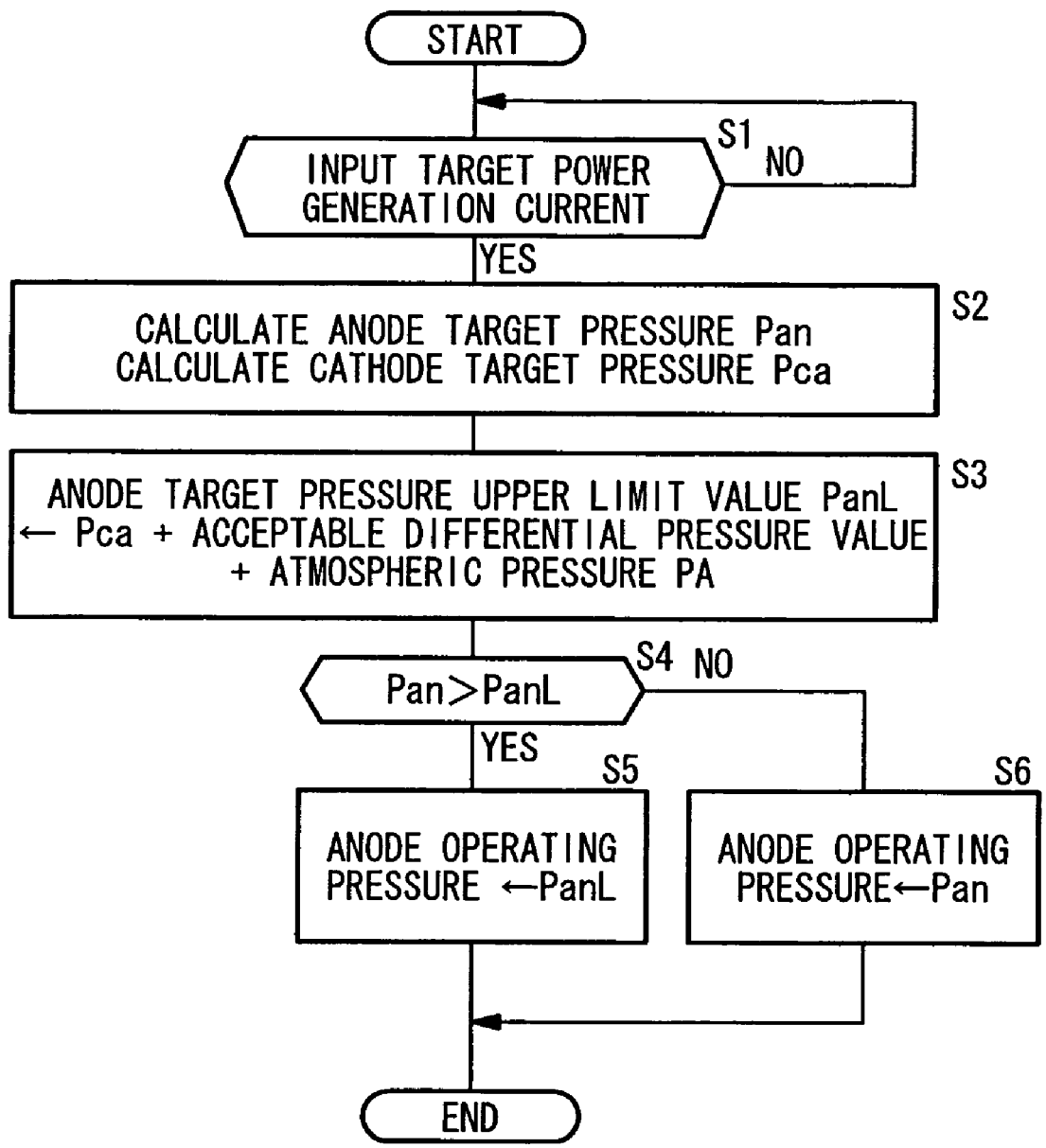
FIG. 4 is a flow chart illustrating a method of operating the fuel cell system.

Next, operations of the fuel cell system, and the method for operating the fuel cell system according to the present invention, shall be described with reference to the flow chart shown in FIG. 4.

Although not shown, the fuel cell system 10 is mounted in a vehicle such as an automobile. First, a target power generation current is input to the control device 74 (YES in step S1), and the routine proceeds to step S2. In step S2, corresponding to the target power generation current, a cathode target pressure Pca is calculated from the first operating pressure calculation table 90, and an anode target pressure Pan is calculated from the second operating pressure calculation table 92.

Thereafter, in step S3, the cathode target pressure Pca is added by the first adder 94 to the acceptable differential pressure value, in order to produce an anode target pressure upper limit value (gauge pressure). The gauge pressure is transmitted to the second adder 96. Further, the atmospheric pressure PA is input to the second adder 96, in order to obtain an anode target pressure upper limit value PanL (absolute pressure).

Then, in step S4, in the upper limit operating pressure restriction unit 98, if it is determined that the anode target pressure Pan obtained from the second operating pressure calculation table 92 is larger than the anode target pressure upper limit value PanL (YES in step S4), the routine proceeds to step S5, thus setting the anode operating pressure at the anode target pressure upper limit value PanL.

In step S4, if it is determined that the anode target pressure Pan is smaller than the anode target pressure upper limit value PanL (NO in step S4), the routine proceeds to step S6, thus setting the anode operating pressure at the anode target pressure Pan.

The control device 74 controls operation of the oxygen-containing gas supply system 40 such that the cathode target pressure (cathode operating pressure) Pca is obtained, and also controls operation of the fuel gas supply system 38 such that the anode operating pressure is obtained. Further, operation of the coolant supply system 42 is controlled for maintaining the fuel cell 12 at a predetermined temperature.

As shown in FIG. 1, in the fuel gas supply system 38, hydrogen gas, which is supplied from the hydrogen tank 44 of the hydrogen supply apparatus 46, flows through the hydrogen supply channel 50 of the hydrogen circulation apparatus 48, and then flows into the fuel gas inlet port 32*a* of the fuel cell 12. The pressure of the hydrogen gas is regulated so as to remain at the anode target pressure, while the hydrogen gas is supplied into the fuel gas flow field 26 of each of the power generation cells 14, flowing toward the anode 20*b* thereof.

In the oxygen-containing gas supply system 40, air is pressurized to a predetermined pressure (cathode target pressure) by the air compressor 60, and thereafter flows from the air supply channel 62 into the oxygen-containing gas inlet port 34*a* of the fuel cell 12. The air is supplied to the oxygen-containing gas flow field 28 of each of the power generation cells 14 and flows toward the cathode 20*c* thereof. Therefore, in each of the membrane electrode assemblies 20, hydrogen gas supplied to the anode 20*b* and air supplied to the cathode 20*c* are consumed in electrochemical reactions in order to generate electricity.

Exhaust gas, containing unconsumed hydrogen discharged from the anode 20*b*, flows from the fuel gas outlet port 32*b* of the fuel cell 12 into the hydrogen circulation channel 54. The exhaust gas flows through the hydrogen circulation channel 54 and from the hydrogen circulation apparatus 48 to the hydrogen supply channel 50, where the exhaust gas is supplied again as a fuel gas to the fuel cell 12.

Further, air consumed at the cathode 20c is discharged from the oxygen-containing gas outlet port 34b into the air discharge channel 66. In the fuel cell 12, coolant is supplied and circulated to the coolant flow field 30 under operation of the circulation pump 72 of the coolant supply system 42.

In the present embodiment, the anode target pressure on the anode 20b side is set using absolute pressure, whereas the cathode target pressure on the cathode 20c side is set using a relative pressure relative to atmospheric pressure. Therefore, when the fuel cell system 10 is operated at high altitudes, the compression ratio of the air compressor 60 does not have to be increased in order to maintain the cathode target pressure.

Normally, the air compressor 60 is configured in such a manner that the air compressor 60 operates efficiently at level land. When the compression ratio is increased for use at higher altitudes having low air density, the air compressor 60 operates within a low efficiency operating range. In this regard, according to the present embodiment, since the cathode target pressure is set using relative pressure, the air compressor 60 can continue to operate within a high efficiency operating range. Thus, the power consumption of the air compressor 60 can be suitably reduced.

Figure 5:
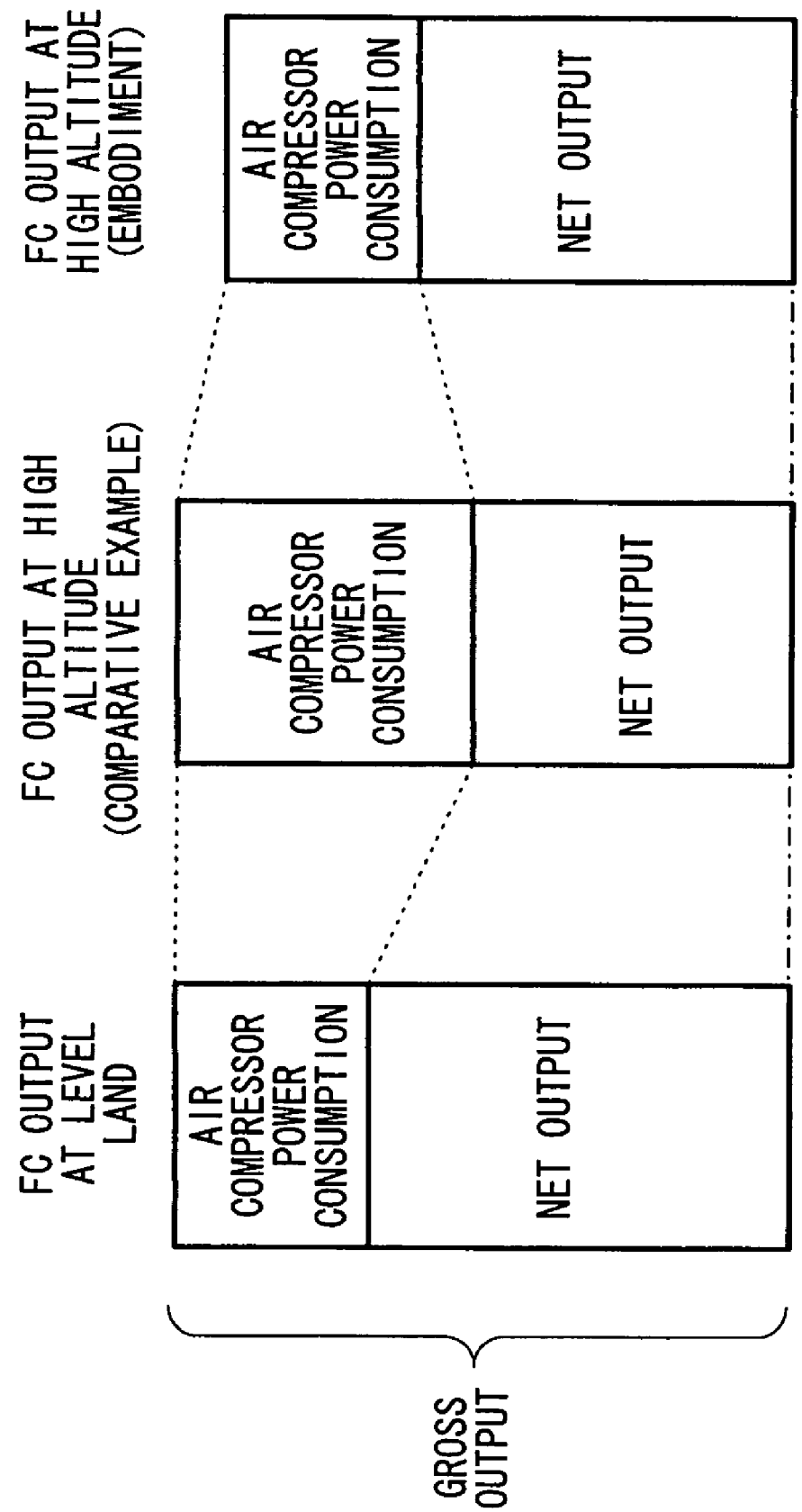
FIG. 5 is a graph comparing fuel cell output on level ground, fuel cell output according to a comparative example, and fuel cell output in accordance with the embodiment of the present invention.
Figure 6:
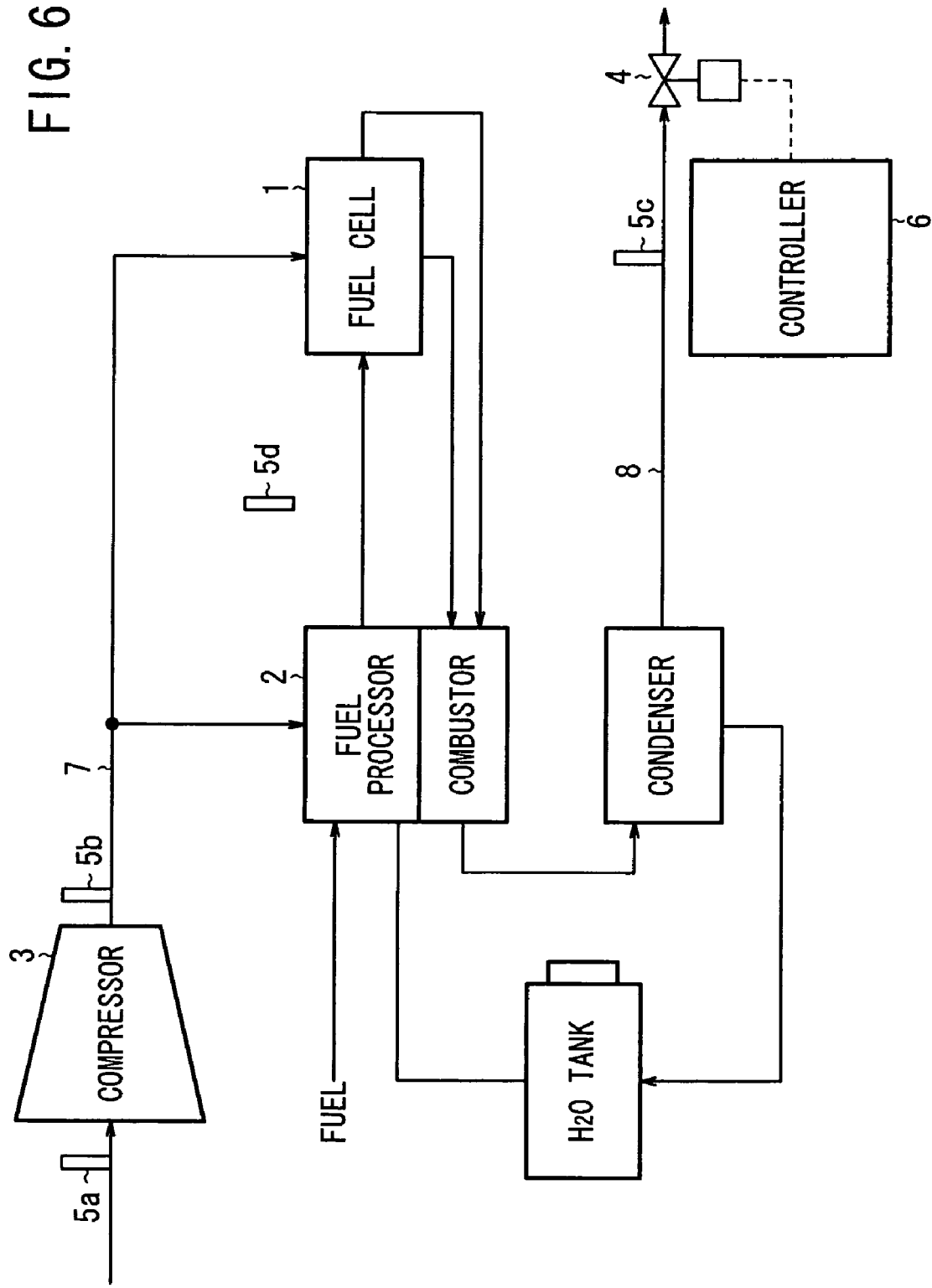
FIG. 6 is a diagram schematically showing the fuel cell system disclosed in Japanese Laid-Open Patent Publication No. 2001-345112.

FIG. 5 shows the results of a comparison between fuel cell (FC) output when operating on level land, fuel cell output according to a comparative example when operating at a high altitude, and a fuel cell output according to the present embodiment when operating at a high altitude. Concerning fuel cell output, when the fuel cell is operated on level land, the air compressor 60 functions highly efficiently. Therefore, power consumption of the air compressor 60 is minimized, and a high output (NET output) of the fuel cell system 10 can be efficiently obtained.

In the comparative example, in which operation of the air compressor 60 is controlled using absolute pressure, although the total output (GROSS output) is equal to the fuel cell output when operating on level land, the power consumption of the air compressor 60 increases greatly, while the NET output of the fuel cell decreases significantly.

By contrast, in the present embodiment, although the total output (GROSS output) of the fuel cell is lowered in comparison with fuel cell output when operating on level land, as a result of the decrease in the cathode operating pressure by the air compressor 60 when operating at high altitudes, the overall power consumption of the air compressor 60 is suitably controlled. As a result, the NET output of the fuel cell increases effectively, as compared with the case of the comparative example.

Therefore, the fuel cell system 10 is not influenced by fluctuations in ambient pressure at high altitudes or the like. By implementing simple steps and using a simple structure, an improvement in power generation efficiency of the fuel cell 12 can be achieved.

Further, a conventional controller for controlling the cathode pressure regulator valve (pressure regulator valve 68) is not required. The cathode pressure regulator valve may not be used. Therefore, the structure of the fuel cell system 10 and the steps for operating the fuel cell system 10 are simplified. Further, by preventing lowering of the stoichiometric ratio, an advantage is achieved with respect to power generation stability.

Further, as shown in FIG. 3, by setting an acceptable differential pressure value between the anode target pressure and the cathode target pressure, a differential pressure in excess of an acceptable value is not applied to the fuel cell 12. Thus, for example, it is possible to prevent damage to the solid polymer electrolyte membrane 20a.

While the invention has been particularly shown and described with reference to a preferred embodiment thereof, it will be understood that variations and modifications can be effected to the present invention by persons skilled in the art without departing from the spirit and scope of the invention as defined by the appended claims.

What is claimed is:

1. A method of operating a fuel cell system comprising a fuel cell, which is operated to provide power generation by consuming a fuel gas supplied to an anode and an oxygen-containing gas supplied to a cathode, the method comprising the steps of:
    detecting an atmospheric pressure with a first pressure sensor;
    detecting an operating pressure of the oxygen-containing gas supplied to the cathode represented as a gauge pressure with a second pressure sensor, wherein the gauge pressure is a differential pressure derived from the atmospheric pressure;
    detecting an operating pressure of the fuel gas supplied to the anode represented as an absolute pressure with a third pressure sensor, wherein the absolute pressure is equal to a sum of the gauge pressure and the atmospheric pressure;
    setting an oxygen-containing gas operating pressure target value on the cathode side using the gauge pressure;
    setting a fuel gas operating pressure target value on the anode side using the absolute pressure; and
    controlling a power generation current of said fuel cell using as command values the gauge pressure and the absolute pressure.

2. A method according to claim 1, further comprising the steps of detecting a differential pressure between the fuel gas operating pressure target value on the anode side and the oxygen-containing gas operating pressure target value on the cathode side; and
    setting a fuel gas operating pressure upper limit value on the anode side based on the oxygen-containing gas operating pressure target value on the cathode side, the atmospheric pressure, and the differential pressure.

3. A method according to claim 2, wherein an acceptable differential pressure value is set for the differential pressure in advance.

* * * * *